UNITED STATES PATENT OFFICE.

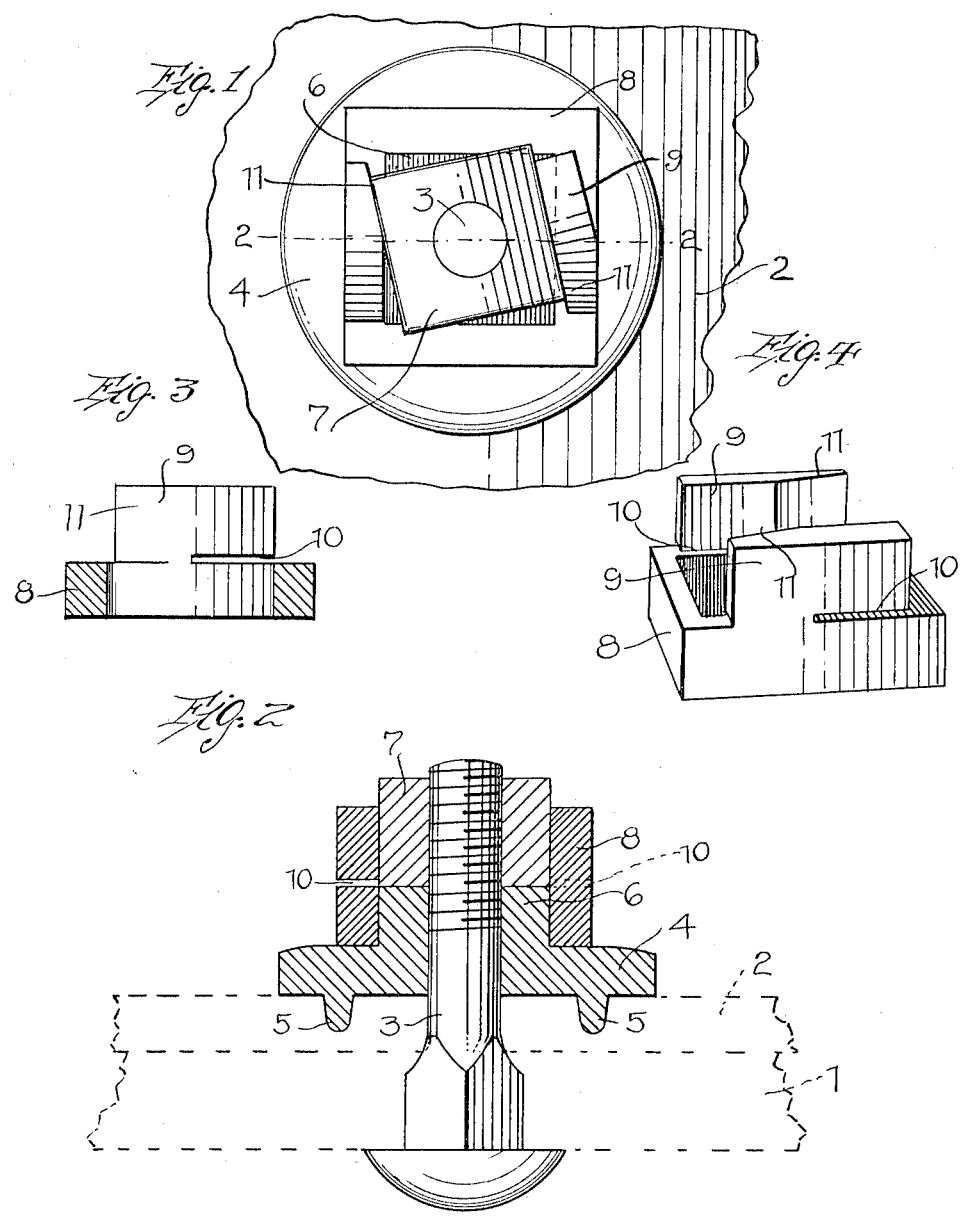

WILLIAM J. CLEARY, WILLIAM B. CLEARY, AND JOHN C. CLEARY, OF JEFFERSONTOWN, KENTUCKY, ASSIGNORS OF ONE-FOURTH TO WILLIAM R. B. HALL, OF MOUNT WASHINGTON, KENTUCKY.

NUT-LOCK.

1,073,665.  Specification of Letters Patent.  Patented Sept. 23, 1913.

Application filed January 8, 1913. Serial No. 740,876.

*To all whom it may concern:*

Be it known that we, WILLIAM J. CLEARY, WILLIAM B. CLEARY, and JOHN C. CLEARY, citizens of the United States, residing at Jeffersontown, in the county of Jefferson and State of Kentucky, have invented certain new and useful Improvements in Nut-Locks, of which the following is a specification, reference being had to the accompanying drawings.

This invention relates to new and useful improvements in nut locks and the primary object of the invention is to provide an improved nut lock which may be readily and quickly applied to use upon all machinery, wood-work and the like.

A further object of the invention resides in providing a locking frame adapted to be applied over the nut after the latter has been turned home and a still further object resides in providing such an improved locking means as will prevent the nut from being disengaged until the latter has been further tightened on the bolt.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a front elevation showing our improved nut lock applied to use. Fig. 2 is a vertical section therethrough as seen on line 2—2, Fig. 1. Fig. 3 is a section through the locking frame; and Fig. 4 is a perspective view of the locking frame removed.

In describing our invention, we shall refer to the drawing in which similar reference characters designate corresponding parts throughout the several views and in which—

1 and 2 indicate a pair of members adapted to be clamped together, the same having disposed therethrough a bolt 3. Applied to said bolt to rest against the outer face of the one member 2, is a disk-like washer 4, the latter being provided with studs or prongs 5 which are adapted to be received in various openings formed in the outer face of said member 2 and the outer face of the disk-like washer 4 is provided with a central boss or the like 6 which is substantially square in plan.

Applied to the threaded end of the bolt 3, is a square nut 7 which, when turned home, will contact with the outer face of the boss 6 and as said nut is preferably of the same size as said boss, the faces of the latter and said nut will aline with one another when said nut is properly applied. While we have shown and described a square boss and correspondingly shaped nut, any preferred design of nut and boss may be provided but in all instances, the nut must be of identically the same shape as the boss. A square nut and boss is, however, most preferable.

In order to lock the nut 7 in place, we provide our improved locking means which comprises a substantially square frame 8, which is adapted to be applied over the nut and boss to rest on the shoulder 4 and encircle said boss. This frame 8 is preferably of the same thickness as the boss 6 so that when applied to the latter, the upper face of the frame and the upper face of the boss will be in the same horizontal plane. Formed on the upper edges or faces of two opposed walls of said frame 8, are the flange-like projections 9, the same being spaced for the greater portion of their length from the upper edges or faces of the respective walls by providing slots 10 therebetween. These flange-like projections which are actually formed from continuations of the walls of said frame 8 have the outer faces thereof flush with the outer faces or edges of said frame 8 and it must be here stated that the slots 10 which are provided between portions of said projections and the upper faces of the respective walls of the frame extend from opposite ends of said projections so that the junctions of these projections and the walls of the frame are at opposite ends of said projections. The inner faces of these projections 9 are beveled oppositely as shown at 11 at the points thereon which are integral with the frame proper and the remaining portions of said projections are normally flush with the inner faces of the respective walls of said frame 8.

This construction permits the nut to be turned back after the locking frame 8 has been applied so that the corners of the nut are disposed over the upper faces or edges of said locking frame, thereby retaining the latter in position. The free ends of the flange-like projections 9 may then be forced inwardly toward one another to contact directly with opposite faces of the nut, since this frame and the flanges thereon are formed from yielding metal, thereby securing the nut against all incidental or casual movement.

In order to remove the nut, after our improved locking means has been applied to use thereon, it is first necessary to apply the wrench to the nut on the faces thereof between the flange-like projections 9 and then turn the same forward or tighter on the bolt, until the faces of said nut register with the faces of the boss on the washer. By so turning the nut, the free distorted ends of the flange-like projections will be forced back to their normal positions over the upper faces of the walls of the frame and said frame 8 may be then readily removed. The nut may then be turned counter-clockwise as usual, until the same is entirely removed from the bolt.

In the drawing, we have shown and in the specification, we have described this device as particularly applied to use in connection with machine parts or wood-work, but it will be understood that this improved nut lock may also be applied to use in connection with car rails for securing joints and the like. When so applied, however, the particular form of washer shown and described is omitted, but the application of the locking frame with its flange-like projections is identically the same as that described above.

From the above description, the manner of applying our improved nut lock to use and the manner of removing the same, will be readily understood and it will be seen that we have provided a simple, inexpensive and efficient means for carrying out the objects of the invention.

While we have particularly described the elements best adapted to perform the functions set forth, it is obvious that various changes in form, proportion and in the minor details of construction which fall within the scope of the claims may be resorted to without departing from the spirit or sacrificing any of the principles of the invention.

Having thus described this invention, what is claimed is:—

1. In a nut lock, the combination with a nut and bolt; of a washer applied to the bolt below the nut, said washer being provided with a central boss of the same design as said nut, a frame applied over said nut and boss to encircle the latter, and said frame provided with means integral therewith adapted to be distorted into engagement with the faces of said nut to secure the latter against rotation on the bolt.

2. In a nut lock, the combination with a nut and bolt; of a washer applied to the bolt below the nut, said washer being provided with a central boss of the same design as said nut, a frame applied over said nut and boss to encircle the latter, and flexible projections formed on said frame adapted to be distorted into engagement with the opposed faces of said nut to prevent the rotation of the latter on the bolt.

3. In a nut lock, the combination with a nut and bolt; of a washer applied to the bolt below the nut, said washer being provided with a central boss of the same design as said nut, a frame applied over said nut and boss to encircle the latter, and projections formed on the outer edges of said frame, said projections having portions thereof so designed as to permit said nut to be partially rotated counter-clockwise after the frame has been applied, the remaining portions of said projections being adapted for distortion against the opposite faces of said nut to secure the same against turning on the bolt.

4. In a nut lock, the combination with a nut and bolt; of a washer applied to the bolt below the nut, said washer being provided with a central boss of the same design as said nut, a frame applied over said nut and boss to encircle the latter, and a pair of flange-like projections formed on the upper edges of a pair of opposed walls of said frame, portions of the inner faces of said flanges being oppositely beveled to permit the nut to be turned counter-clockwise on the bolt whereby the corners of said nut may be disposed over the upper faces of said frame to prevent the removal of the latter, the remaining portions of said projections being adapted for distortion against the faces of said nut to secure the latter against turning on the bolt.

In testimony whereof we hereunto affix our signatures in the presence of two witnesses.

WILLIAM J. CLEARY.
WILLIAM B. CLEARY.
JOHN C. CLEARY.

Witnesses:
ALBERT FISHER,
H. S. FREDERICK.